United States Patent [19]
DiPeri

[11] Patent Number: 5,450,731
[45] Date of Patent: Sep. 19, 1995

[54] SENSIBLE AIR CONDITIONING SYSTEM AND ENERGY MINIMIZER

[76] Inventor: Leonard J. DiPeri, 18325 Lahey St., Northridge, Calif. 91326

[21] Appl. No.: 198,950
[22] Filed: Feb. 22, 1994
[51] Int. Cl.6 .............................................. F28D 5/00
[52] U.S. Cl. ...................................... 62/97; 62/259.4; 62/314
[58] Field of Search ................ 62/121, 122, 97, 259.4, 62/304, 314, 316

[56] References Cited

U.S. PATENT DOCUMENTS

| Re. 32,461 | 7/1987 | Di Peri | 62/314 |
|---|---|---|---|
| 1,863,577 | 6/1932 | Morse et al. | 62/121 |
| 1,887,938 | 11/1932 | Lewis | 62/259.4 |
| 2,085,964 | 7/1937 | Fonda | 62/97 |
| 3,153,914 | 10/1964 | Meckler | 62/97 |
| 3,214,936 | 11/1965 | Di Peri | 62/314 |
| 3,859,818 | 1/1975 | Goettl | 62/311 |
| 3,877,244 | 4/1975 | Di Peri | 62/314 |
| 4,505,327 | 3/1985 | Angle et al. | 165/48 R |
| 4,674,295 | 6/1987 | Curtis | 62/309 |

Primary Examiner—Henry A. Bennet
Assistant Examiner—William C. Doerrler
Attorney, Agent, or Firm—William H. Maxwell

[57] ABSTRACT

A sensible cooled air conditioning system comprised of a primary wet-dry side sensible heat exchanger using water refrigerant that changes to its vapor phase at the wet side by adsorption of sensible heat from the useful conditioned air passing therethrough and into a supply air duct, a blower for moving conditioned air through and from said duct, and the wet side air being exhausted as vapor laden humidified air, and a secondary refrigeration air conditioner for cooling and/or heating and removed from the supply air duct to eliminate pressure drop in said duct by an inlet opening from the supply air duct to receive a portion of said conditioned air and by an outlet opening into the supply air duct to return said conditioned air with additional sensible cooling and latent heat cooling for dehumidification, and a blower for moving conditioned air independently through the secondary refrigeration air conditioner.

14 Claims, 1 Drawing Sheet

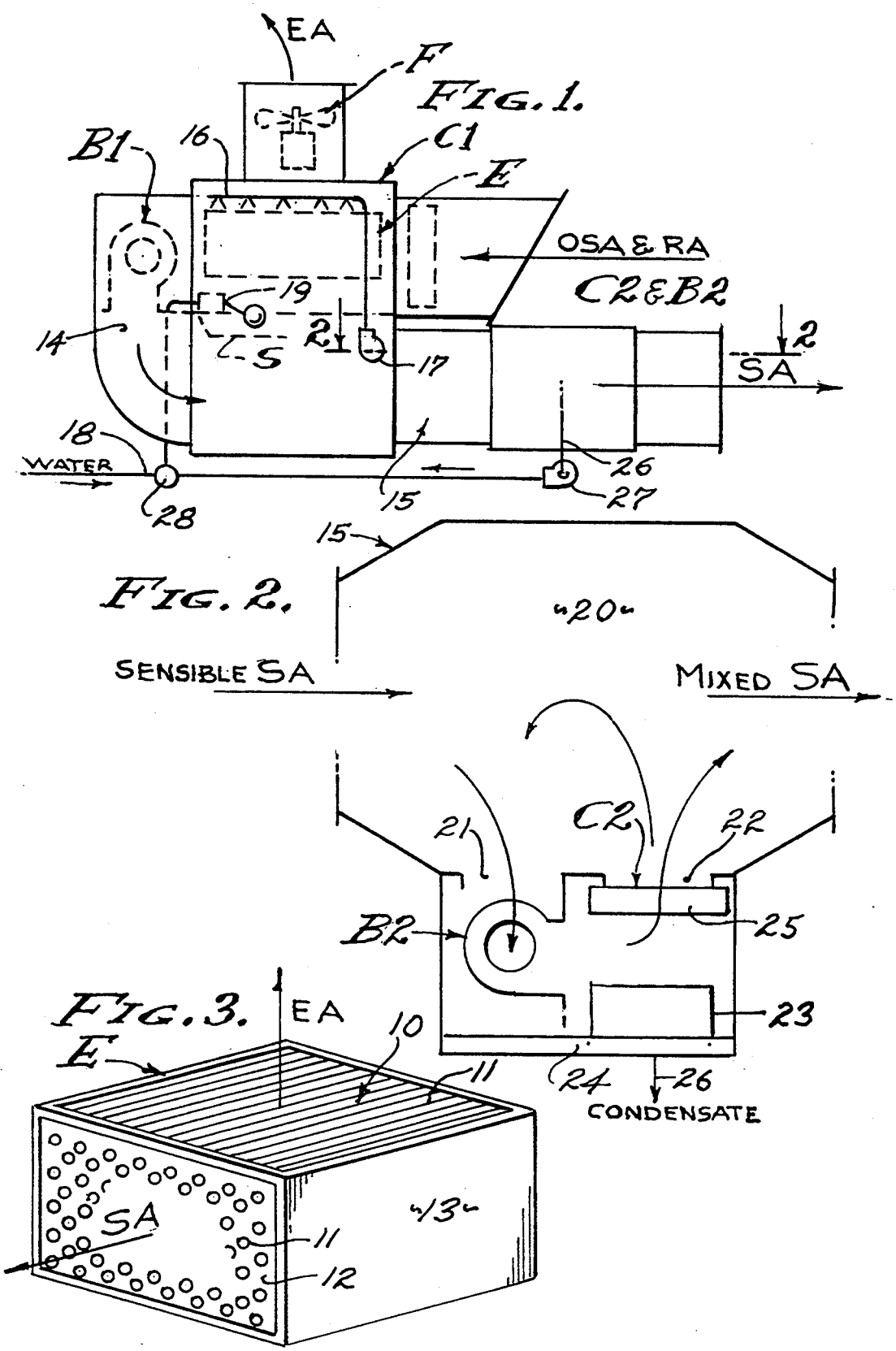

SENSIBLE AIR CONDITIONING SYSTEM AND ENERGY MINIMIZER

BACKGROUND OF THE INVENTION

Conventional air conditioner systems employ cooling and heating coils positioned in the supply air column, or ducting, so that the air flowing through the conditioner is in constant direct contact with the usual coil fins. And, this is the case whether or not there is a demand for cooling or heating, or ventilation only. As a result, there is a constant and persistent pressure drop as a result of air friction through the cooling-heating coil, and this feature manifests itself as energy consumed. It is to be understood that this pressure drop feature is to be found in conventional cooling and heater ducting, refrigerated air conditioner ducting, and heat-pump ducting etc.

According to the foregoing, it is a general object of this invention to minimize the pressure drop in air conditioning ducting, in order to reduce operating energy costs. It is also an object of this invention to provide primary sensible cooling by means of the phase change in water subjected to the heat from incoming outside air, all without the use of external energy. Significantly, electrical (or other) power is not required to attain said phase change.

The aforesaid primary sensible cooling is not intended to fulfill the total cooling demand and therefore it is an object of this invention to provide secondary cooling that does not increase pressure drop in the supply air ducting. This is accomplished by removing the secondary cooling or heating from the supply air duct, so that there can be no air friction loss in the supply air delivery to a conditioned space. In practice, the secondary cooling is by means of a downsized mechanical refrigeration unit, chosen to meet the cooling demand of the particular space to be conditioned. A feature of this energy minimizer concept is a section of the supply air duct that opens laterally into and from a refrigeration unit. This specialized section of the supply air duct functions as a mixing chamber or plenum. Another feature is that air recirculation through the secondary cooling refrigeration unit is independent from supply air circulation. Accordingly, operation of the secondary cooling refrigeration unit has no adverse effect upon air circulation in the supply air duct.

This energy minimizer concept departs from convention by placing a secondary cooling coil outside the confines of a supply air duct and in parallel therewith, and tapped into the duct so that its refrigeration (or heater) coil is not in the direct supply air flow. The primary sensible cooling is by means of phase change of water used as a refrigerant, and this is supplemented on demand for cooling by the secondary cooling refrigeration unit that removes a portion of the air flowing through the mixing-plenum section of the supply air duct, and which further cools and dehumidifies (or heats) said air, and then returns said air into the supply air duct. The supply air duct volume and velocity is not affected.

It is an object of this invention to provide water as a refrigerant to sensibly cool a moving column of air. This is accomplished by employing a heat exchanger that separates two columns of air, one a dry supply air column and the other a wet exhaust air column. In accordance with this invention sensible heat is transfered from the dry side supply air column and into the wet side air column by means of a phase change in a thin film of water refrigerant contacting the wet side of a heat exchange wall, or walls, said refrigerant film adhering intimately to said wall, or walls, by electrophoresis. This phase change caused by adsorption of heat results in chilling through the evaporative process of the water refrigerant which is then exhausted with air as latent heat. Moisture laden refrigerant air does not come into contact with the sensibly cooled supply air. In practice, the refrigerant and supply air source is outside air.

SUMMARY OF THE DISCLOSURE

The benefit of this energy minimizer concept is that there is lower system friction or pressure drop, which saves energy. The primary sensible cooling by means of water refrigerant phase change performs a substantial portion of satisfying the cooling demand, and this combined primary and secondary cooling operates at a fraction of the power input that would otherwise be required by total mechanical refrigeration. The water refrigerant phase change cooling means and minimizer combination permits substantial downsizing of the refrigeration equipment and permits flexibility in equipment capacity when initially installed and when replaced, upgraded or downgraded, should requirements of the conditioned space be changed due to the addition of fixtures, other machinery, and of additional personnel etc. This primary and secondary conditioning concept provides maximum advantage of outside air use when conditions are suitable to reject heat, enabling operation that materially decreases operating costs. Particulate matter that normally accumulates on cooling coil fins is substantially reduced commensurate with the substantial amount of primary cooling that reduces the volume of air flowing through the secondary cooling means, thereby minimizing maintenance costs.

The foregoing and various other objects and features of this invention will be apparent and fully understood from the following detailed description of the typical preferred forms and applications thereof, throughout which description reference is made to the accompanying drawings.

THE DRAWINGS

FIG. 1 is a side elevation of the Sensible Air Conditioning System and Energy Minimizer, in the form of an apparatus having primary and secondary sensible cooling means.

FIG. 2 is an enlarged plan section view taken as indicated by line 2—2 on FIG. 1, and illustrating the secondary sensible cooling means.

FIG. 3 is an enlarged perspective view illustrating the heat exchanger element that characterizes the primary sensible cooling means.

PREFERRED EMBODIMENT

This invention relates to sensible air conditioning that is cost effective with respect to initial capital investment, operational, maintenance, and replacement costs. Outside air OSA and return air RA is conditioned by cooling or heating and by dehumidifying it for use as supply air SA delivered into a conditioned space. And outside air OSA is used to exhaust water vapor resulting from a phase change of water refrigerant applied to a wet side of a sensible heat exchanger E. Accordingly, there is a primary sensible cooling means C1 and blower means B1 for circulating and delivering supply air SA, and there is a blower means F for circulating outside air OSA through said sensible heat exchanger E and exhausting refrigerant laden air referred to herein as exhaust air EA. And, in accordance with this invention there is a secondary sensible cooling means C2 and blower means B2 for recirculating primary conditioned supply air SA through a conditioner coil. A feature herein is that the conditioner coil of cooling means C2 is removed from the supply air SA ducting so that said ducting is devoid of air obstruction, except for the outside air OSA passing through the heat exchanger E, as will be described.

The primary sensible cooling means C1 functions by means of inherent phase change of the water refrigerant, all without power application, the sensible heat of incoming outside air OSA providing the heat energy therefor. The secondary sensible cooling means C2 function is by means of power or energy application and is shown as a packaged mechanical refrigeration unit, for example an air conditioner or heat pump. However, it is to be understood that means C2 can be a heater or furnace, or the like.

Referring now to the primary sensible cooling means C1 as it is disclosed herein, it is characterized by the use of sensible heat from the incoming outside air OSA applied so as to cause a phase change in a thin film of water refrigerant at the wet side of a heat exchange heat transfer wall. The incoming outside air OSA moves as a column in contact with the dry side of said heat exchange wall and becomes conditioned supply air SA substantially reduced in temperature, as its sensible heat is removed by means of heat adsorption into the refrigerant thin film of water, causing a phase change thereof when subjected to air flowing over the wet side of the heat exchange wall, changing the water refrigerant to a water vapor that is discharged to atmosphere as exhaust air EA. Thus, there are two mechanisms that remove sensible heat from the outside air OSA as it is converted to supply air SA; one that causes phase change by means of the difference in vapor pressure of the water refrigerant and of the air flowing over the thin film of refrigerant, and the other that causes phase change by means of heat transfer into the thin film of refrigerant from the return air RA and/or outside air OSA (mixed air).

The sensible heat exchanger E is comprised of a sensible heat exchanger core 10 comprised of at least one and preferably a plurality of plastic tubes 11 extending between headers 12, separating two columns of air; one is the exhaust air EA column at the wet outside of the tubes 11, and the other is the supply air SA column at the dry inside of the tubes 11 (see FIG. 3). The headers 12 are joined by opposite side members 13, and the tubes 11 have smooth unobstructed inner surfaces that have little or no air drag. In practice, the total cross sectional area of the tubes is at least equal to or greater than the cross sectional area of the supply air SA ducting, so that there is minimal (negligible) pressure drop through the sensible heat exchanger core 10. As shown, a blower plenum 14 receives primary conditioned supply air SA from the sensible heat exchanger E and directs it from blower means B1 into a supply air duct 15.

The water refrigerant for operation of the primary sensible cooling means C1 is applied to the sensible cooling tubes 11 by means of spray bars 16, the water adhering intimately onto the exterior surfaces of the tubes electrophorectically in the form of a thin film for phase change to a water vapor, caused by the transfer of sensible heat from hot incoming outside air OSA flowing through the sensible heat exchanger core 10. The spray bars 16 are supplied with water from a pump 17 that draws it from a sump S beneath the sensible heat exchanger core 10. A water source 18 fills the sump S, controlled by a float valve 19.

In accordance with this invention, conditioned primary supply air SA delivered by blower B1 passes through a section 20 of the supply air duct 15 and from which a portion of the supply air SA is withdrawn for secondary conditioning and then returned for re-admixing into said primary air SA remaining in the duct section 20. The secondary sensible cooling means C2 is in open communication with section 20 of the supply air duct 15, establishing a mixing chamber or plenum (20) from which primary supply air SA is withdrawn through a lateral inlet opening 21 and then returned through a lateral outlet opening 22. As shown, the sensible cooling means C2 is a package type mechanical refrigeration unit comprised of a compressor 23, an expansion valve (not shown), and a condensing coil 24, the blower means B2 discharging the withdrawn air through a cooling coil 25 (or heat pump coil). The conditioned secondary supply air SA discharges into the supply mixing chamber or plenum 2 of the air duct 15 and admixes with the conditioned primary air remaining therein, thereby establishing a co-mixture adjusted to the combined temperature values per volume of the two conditioned bodies of air. Accordingly, the refrigeration output of the secondary sensible cooling means C2 is adjusted to supply the amount of cooling supplemented to the output of the primary sensible cooling means C1. Temperature control is my means of thermostat means governing the output of the secondary sensible cooling means C2 that supplements the variable output of the primary sensible cooling means C1 that is subject to changing outside air conditions.

Referring now to the secondary sensible cooling means as it is disclosed herein, mechanical air conditioning of this type cools or heats incoming air (OSA and RA) and sensibly lowers or raises its temperature, theoretically without changing its humidity. However, mechanical air conditioners, AC units, inherently dehumidify air refrigerated thereby, as they subject said air to the dewpoint temperature with the cooling coil 25. The result is condensation of latent heat moisture from said cooling coil and this is manifested in the discharge of cold waste water at 26. It is significant herein that the primary sensible cooling means C1 does not remove latent heat from the useful air column, whereas the secondary sensible cooling means C2 not only removes sensible heat but also removes latent heat. Thus, the combined means C1 and C2 removes heat sensibly as well as latently so as to dehumidify the supply air SA as well. The relative cooling capacities of the means C1 and C2 are chosen and/or adjusted to meet the demand as circumstances require. As shown, the waste water at 26 can be used advantageously as the wet side refrigerant in the operation of the primary sensible cooling means C1, delivered thereto by a pump 27 under control of a three-way valve 28 or the like also connected from the water source 18.

From the foregoing it will be understood how cost effective sensible cooling and latent heat dehumidification, or heating, is achieved while eliminating pressure drop from the supply air ducts. of this equipment. The wet-dry tube sensible heat exchanger provides free air flow and transfer of sensible heat from the outside air OSA and the return air RA for the phase change of water refrigerant that directly cools the supply air SA by primary sensible cooling. And, the lateral removal by the secondary sensible cooling means from the supply air duct permits absolutely free flow of supply air while simultaneously removing additional sensible heat and latent heat that dehumidifies the removed portion of the supply air. The rate of delivery of the supply air is determioned solely by operation of the blower means B1, the blower means B2 being operated at a rate that meets the demand for cooling, all without affecting the delivery rate by the primary blower means, and without affecting the pressure drop in the delivery of supply air SA.

Having described only the typical preferred forms and applications of my invention, I do not wish to be limited or restricted to the specific details herein set forth, but wish to reserve to myself any modifications or variations that may appear to those skilled in the art, as set forth within the limits of the following claims.

I claim:

1. A sensible air conditioning system and energy minimizer for conditioned air discharge into a conditioned air space, and including;
   a primary sensible cooling means for removing sensible heat from incoming air conditioned thereby,
   a supply air duct receiving said incoming air as conditioned air from the primary sensible cooling means and discharging it into the conditioned space,
   blower means moving said conditioned air through the supply air duct and discharging it therefrom,
   a secondary sensible cooling means for removing additional sensible heat from said conditioned air, said secondary sensible cooling means being removed from the supply air duct by means of an inlet opening from the supply air duct to receive a portion of said conditioned air and by an outlet opening into the supply air duct to return said portion of said conditioned air with said additional sensible heat removed therefrom,
   and blower means moving said portion of conditioned air independently through the secondary sensible cooling means.

2. The sensible air conditioning system and energy minimizer as set forth in claim 1, wherein the primary sensible cooling means is a heat exchanger exposed to said incoming air at a dry side and discharged as cooled supply air, and exposed to said incoming air at a refrigerant wetted side for heat transfer through at least one wall thereof by vaporization at said wetted side and heated vapor laden relief air exhausted therefrom by blower means.

3. The sensible air conditioning system and energy minimizer as set forth in claim 2, wherein the refirgerant is water.

4. The sensible air conditioning system and energy minimizer as set forth in claim 2, wherein the at least one wall of the heat exchanger is plastic material.

5. The sensible air conditioning system and energy minimizer as set forth in claim 2, wherein the refrigerant is applied to the wetted side as a thin film of liquid.

6. The sensible air conditioning system and energy minimizer as set forth in claim 2, wherein the at least one wall of the heat exchanger is plastic material, and wherein the refrigerant is water applied to the wetted side as a thin film of liquid.

7. The sensible air conditioning system and energy minimizer as set forth in claim 2, wherein the at least one wall of the heat exchanger is plastic and wherein the refrigerant is water electrophorectically applied to the wetted side as a thin evaporative film of liquid.

8. The sensible air conditioning system and energy meinimizer as set forth in claim 1, wherein the primary sensible cooling means is a heat exchanger comprised of a multiplicty of tubes having dry inner walls exposed to said incoming air discharged therefrom as cooled supply air, and having refrigerant wetted outer walls exposed to said incoming air for heat transfer through the tube walls by vaporization phase change of the refrigerant for heat adsorption and exhausted as relief air by blower means.

9. The sensible air conditioning system and energy minimizer as set forth in claim 8, wherein the refrigerant is water.

10. The sensible air conditioning system and energy minimizer as set forth in claim 8, wherein the tubes of the heat exchanger are of plastic material and wherein the refrigerant is water electrophorectically applied to the outer walls of the tubes.

11. The sensible air conditioning system and energy minimizer as set forth in claim 1, wherein the secondary sensible cooling means is a heat pump means for both cooling and heating the portion of said conditioned air moved therethrough by the blower means.

12. The sensible air conditioning system and energy minimizer as set forth in claim 1, wherein the secondary sensible cooling means is a mechanical refrigeration means for sensible cooling the portion of said conditioned air moved therethrough by the blower means.

13. The sensible air conditioning system and energy minimizer as set forth in claim 1, wherein the primary sensible cooling means sensibly cools the incoming air without removing latent heat from the useful conditioned air discharged therethrough, and wherein the secondary sensible cooling means is a mechanical refrigeration means for subjecting the portion of said conditioned air moved therethrough by the blower means to its dewpoint termperature to sensibly cool and remove latent heat therefrom and thereby dehumidifying said conditioned air.

14. The sensible air conditioning system and energy minimizer as set forth in claim 2, wherein the primary sensible cooling means sensibly cools the incoming air without removing latent heat from the useful conditioned air discharged theretherough,
   wherein the secondary sensible cooling means is a mechanical refrigeration means for subjecting the portion of said conditioned air moved therethrough by the blower means to its dewpoint temperature to sensibly cool and remove latent heat therefrom by condensation and thereby dehumidifying said conditioned air,
   and wherein the latent heat condensatiion of said mechanical refrigeration means is applied as refrigerant to the wetted side of the primary cooling means.

* * * * *